(12) United States Patent
March

(10) Patent No.: US 6,808,430 B1
(45) Date of Patent: Oct. 26, 2004

(54) AMPHIBIOUS VEHICLE

(76) Inventor: J. David March, 8 Premiere Point, Newport Coast, CA (US) 92657

( * ) Notice: Subject to any disclaimer, the term of this patent is extended or adjusted under 35 U.S.C. 154(b) by 0 days.

(21) Appl. No.: 10/412,352

(22) Filed: Apr. 11, 2003

(51) Int. Cl.$^7$ .................................................. B60F 3/00
(52) U.S. Cl. ............................... 440/12.52; 440/12.66; 440/38; 440/88 C; 440/88 HE
(58) Field of Search ........................ 114/344; 440/12.5, 440/12.51, 12.52, 12.53, 12.54, 12.66, 38, 40–43, 88 C, 88 HE

(56) References Cited

U.S. PATENT DOCUMENTS

| | | | | |
|---|---|---|---|---|
| 3,090,973 A | * | 5/1963 | Levinson | 114/344 |
| 4,958,584 A | * | 9/1990 | Williamson | 440/12.52 |
| 5,531,179 A | * | 7/1996 | Roycroft et al. | 440/12.5 |
| 5,562,066 A | * | 10/1996 | Gere et al. | 440/12.51 |
| 2003/0176118 A1 | * | 9/2003 | Roycroft | 440/12.5 |

* cited by examiner

Primary Examiner—Sherman Basinger
(74) Attorney, Agent, or Firm—Edgar W. Averill, Jr.

(57) ABSTRACT

An amphibious vehicle which on land looks remarkably like a conventional automobile. The wheels may be raised when the vehicle is in the water. The engine is placed in the stern, directly over the jet and transaxle, which provides room for four passengers. The vehicle has plates which slide under the wheels for use in water, and the plates do not extend up over the sides of the wheel wells.

24 Claims, 14 Drawing Sheets

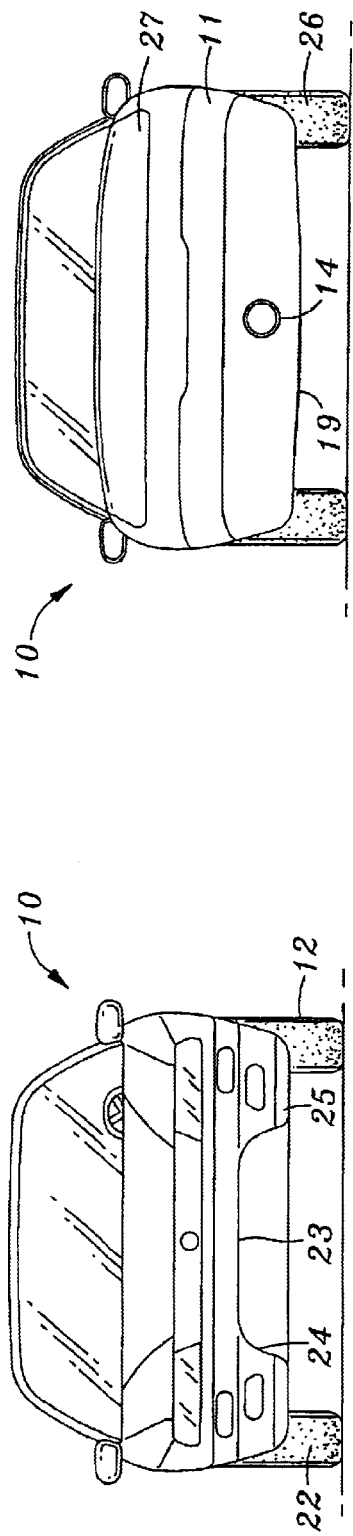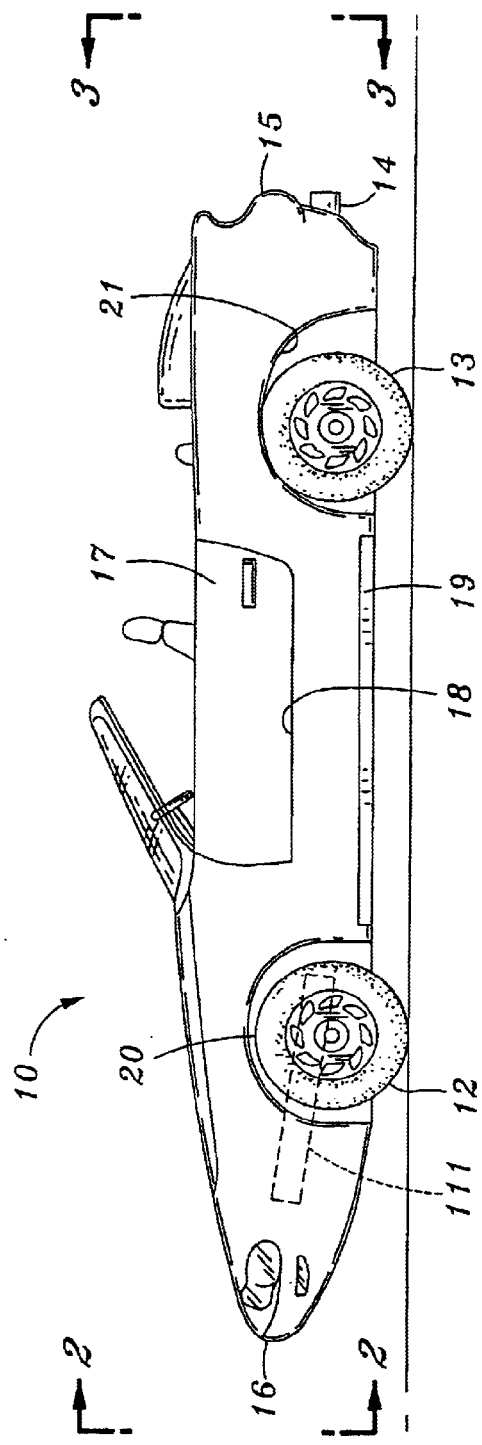

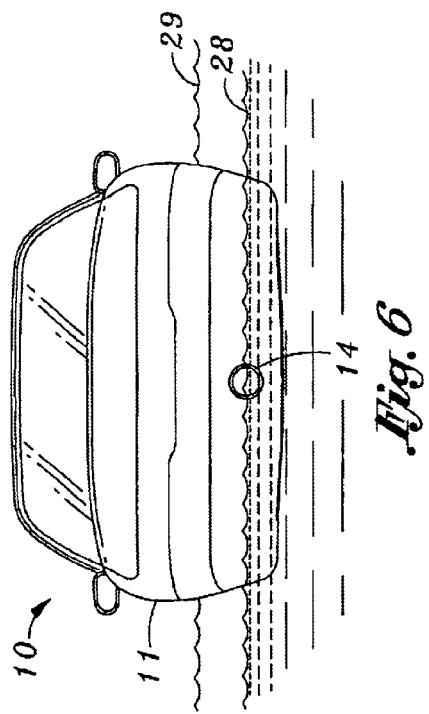
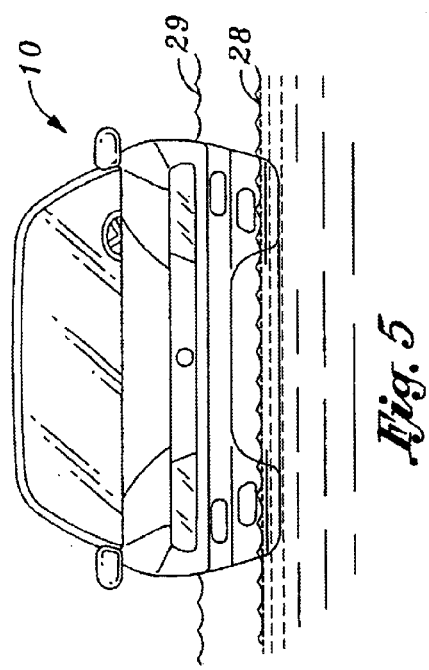
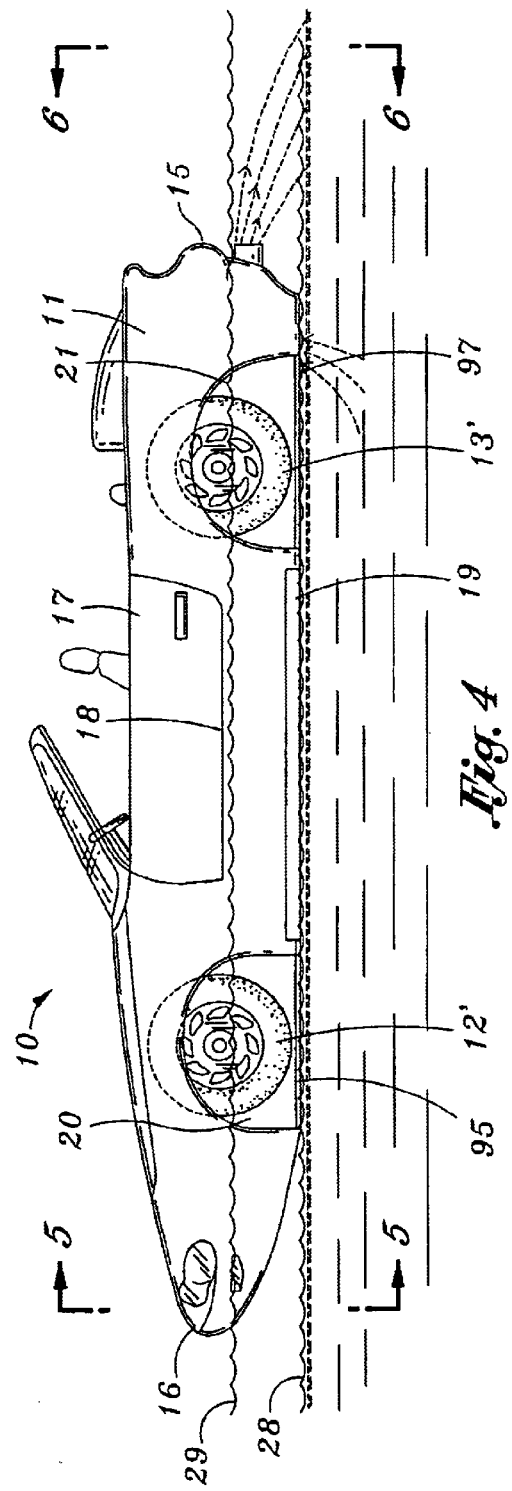

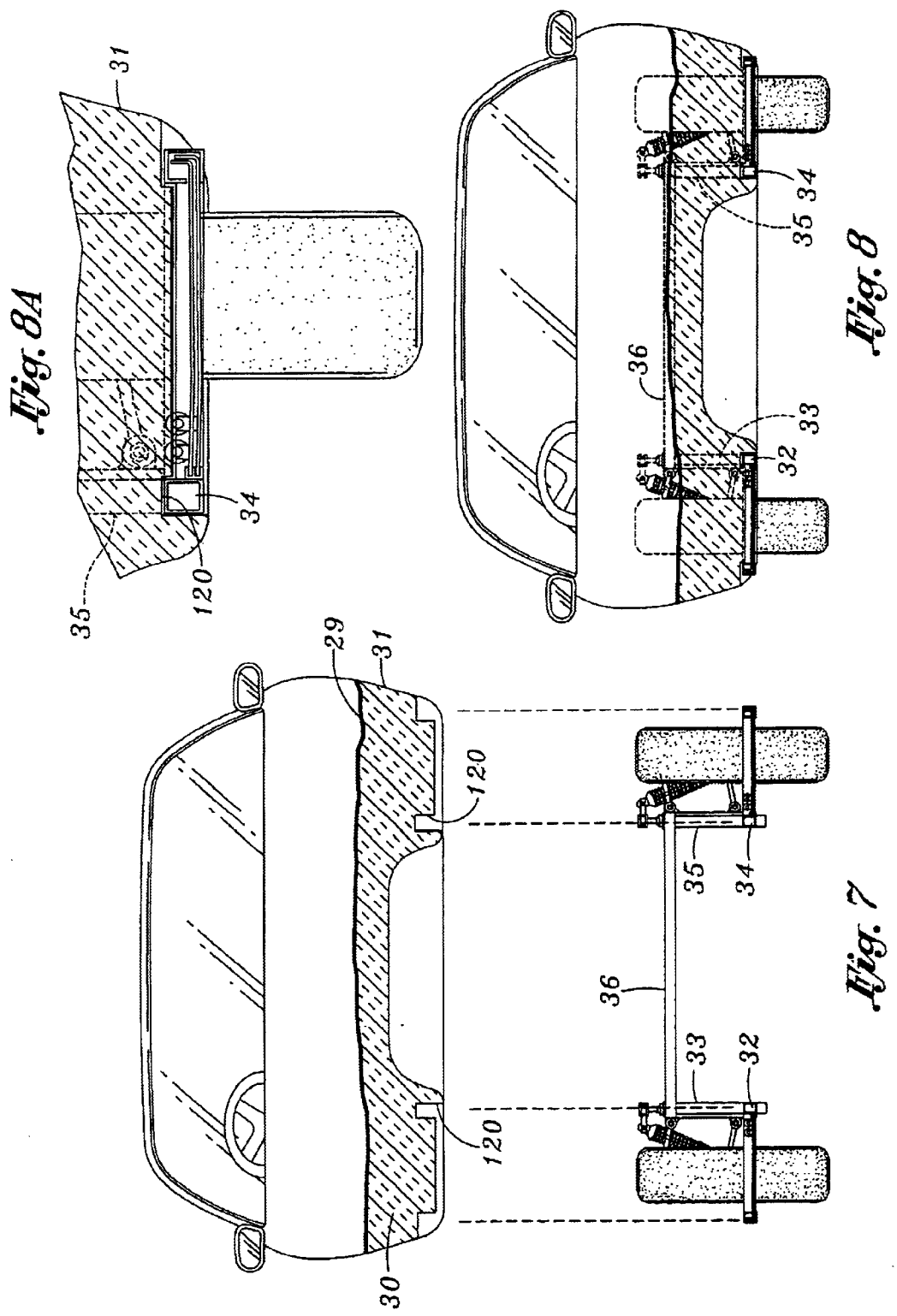

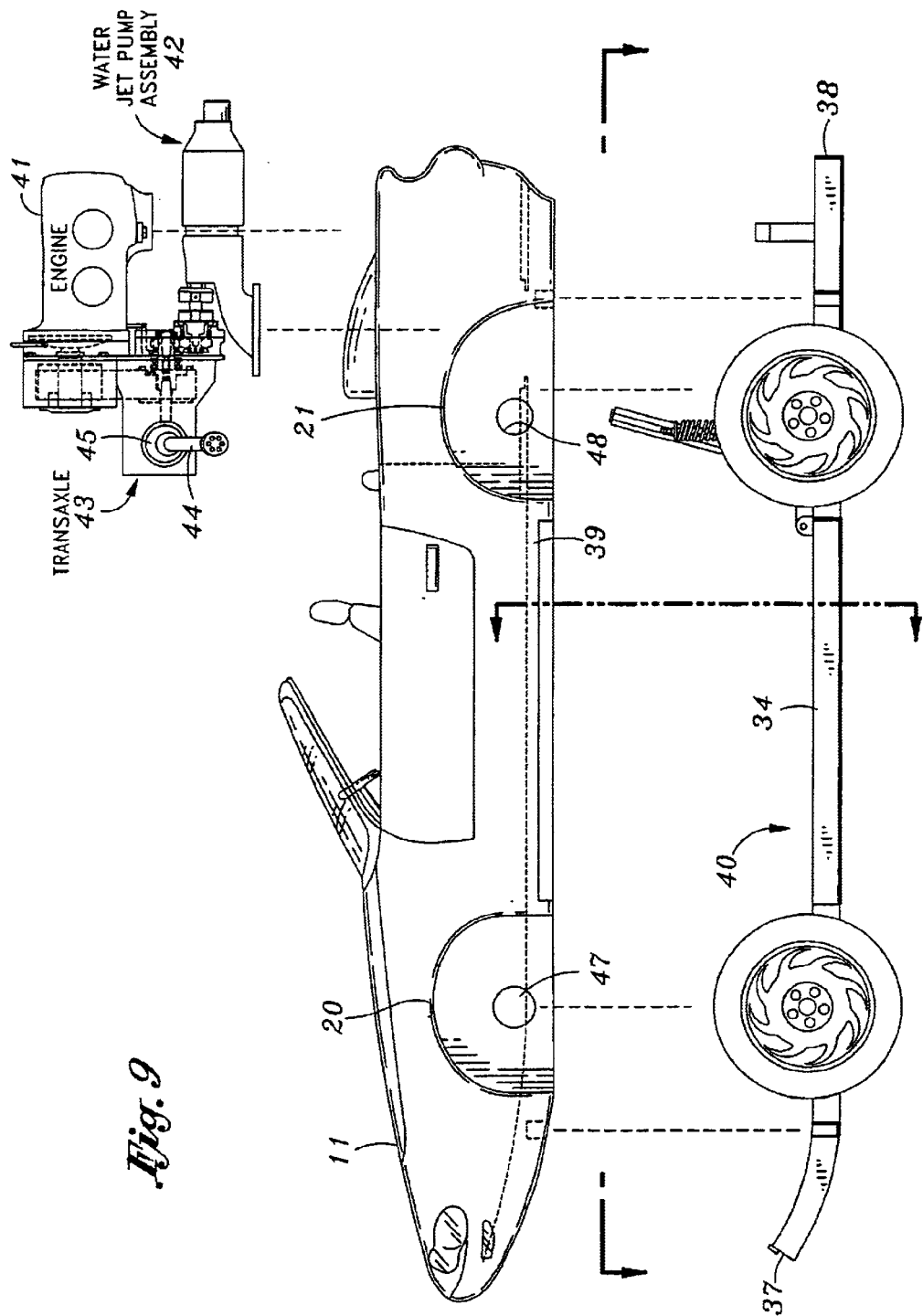

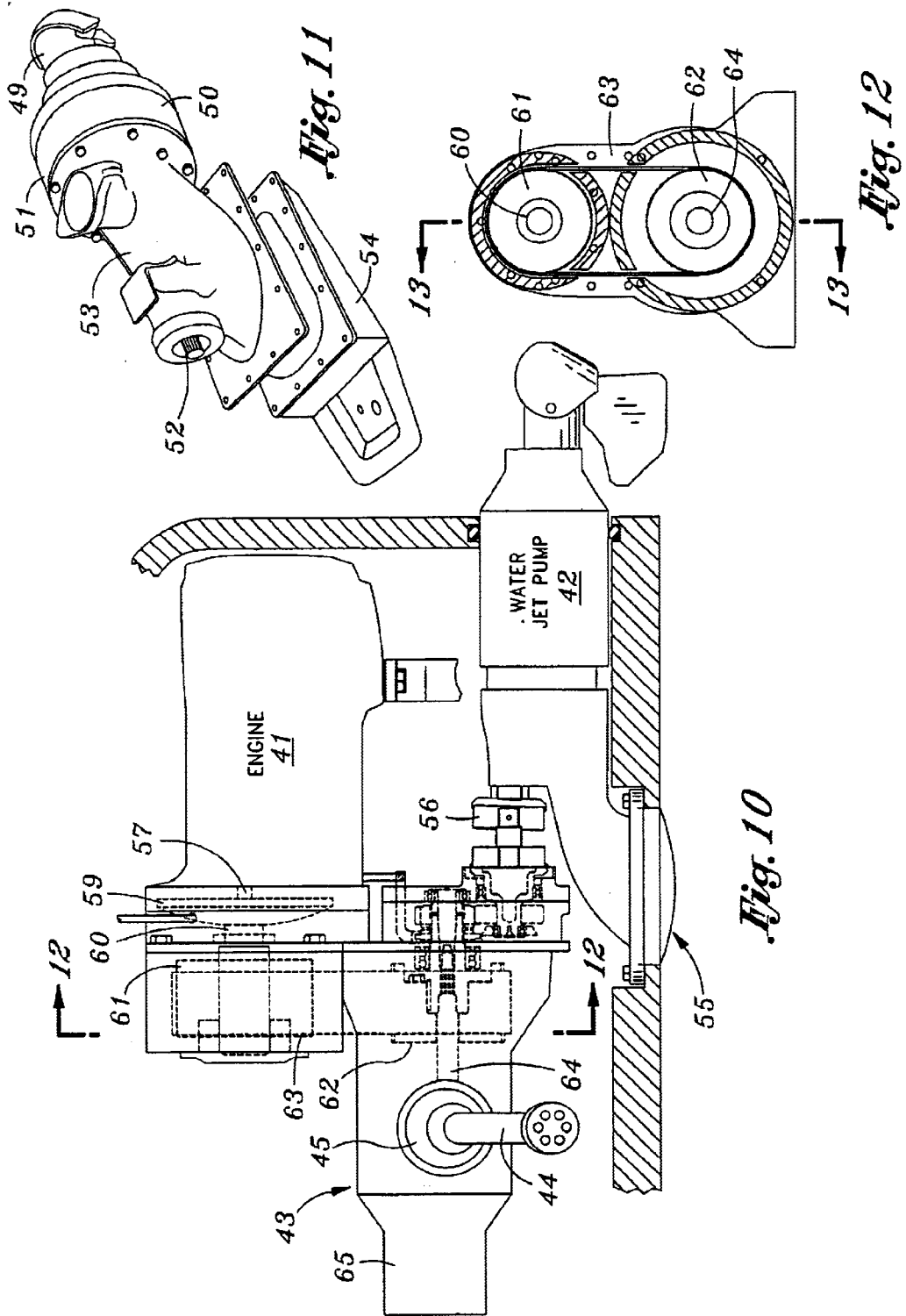

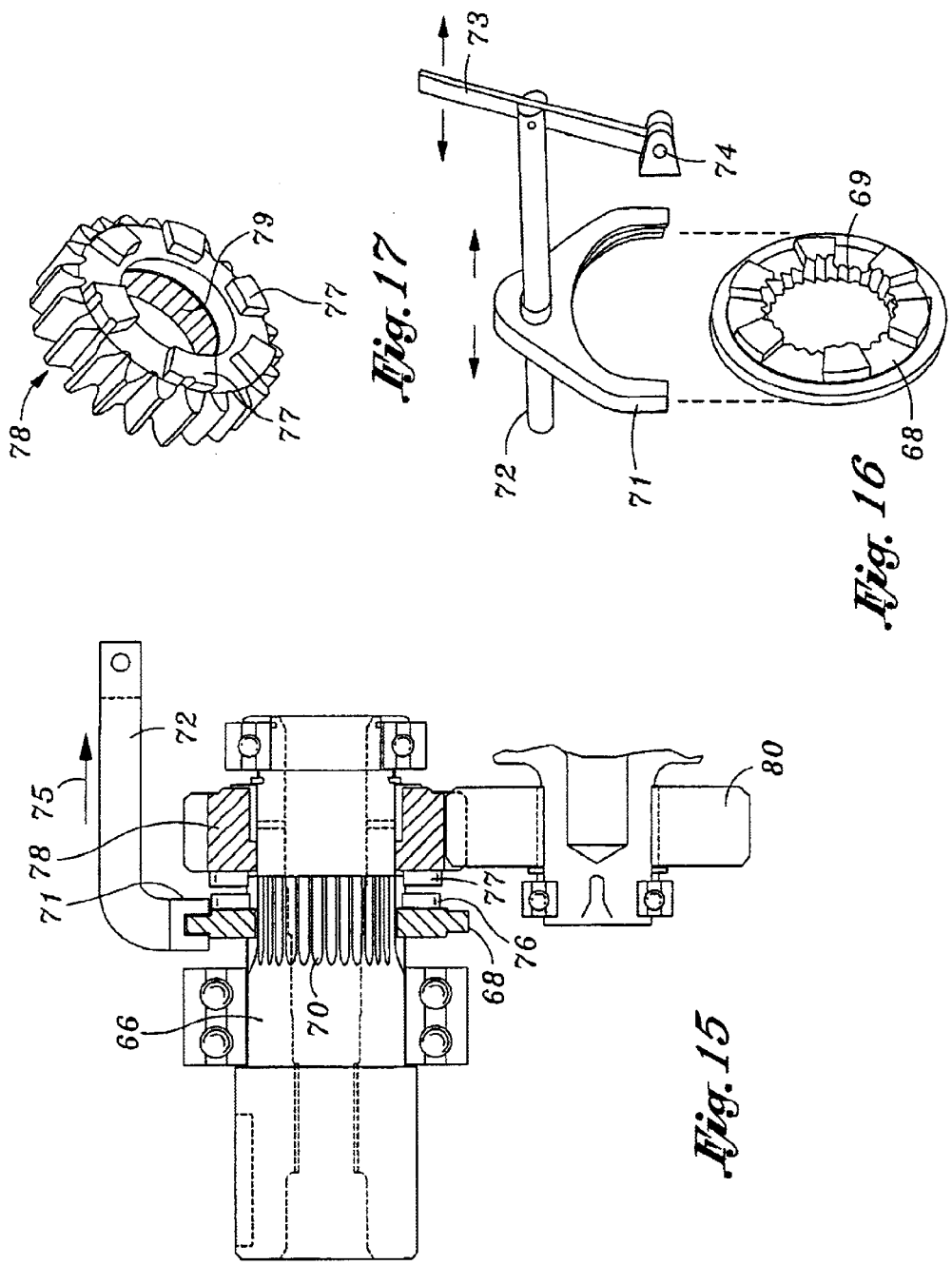

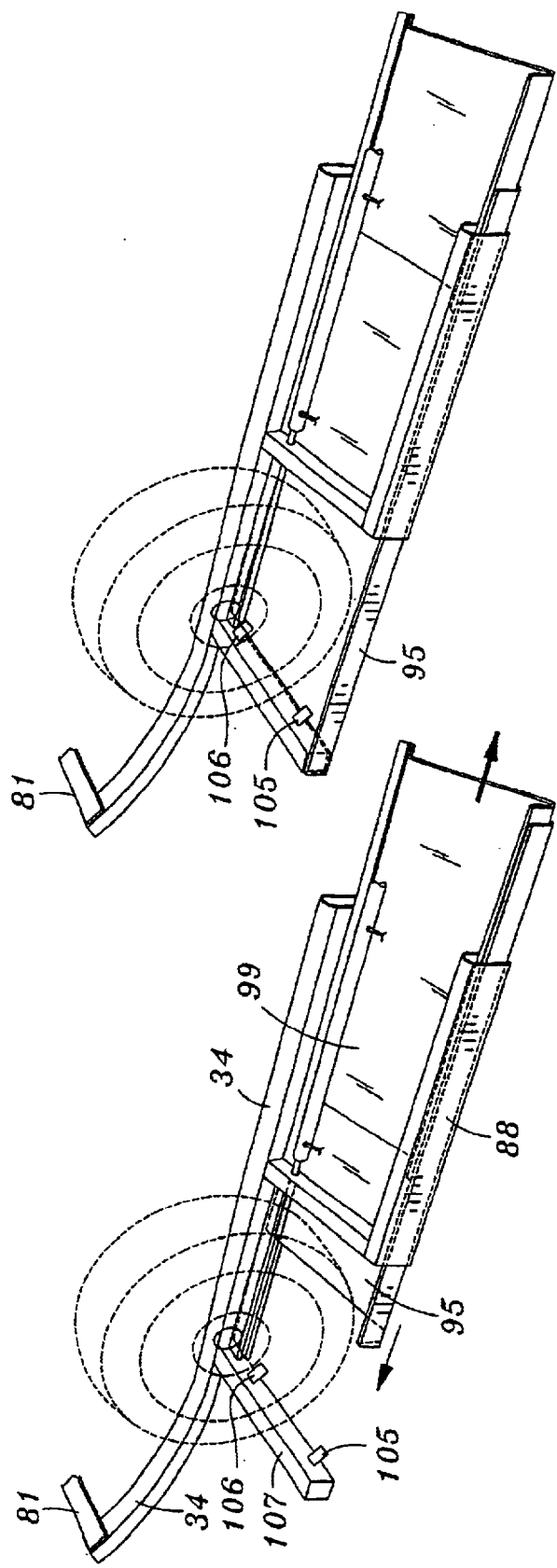

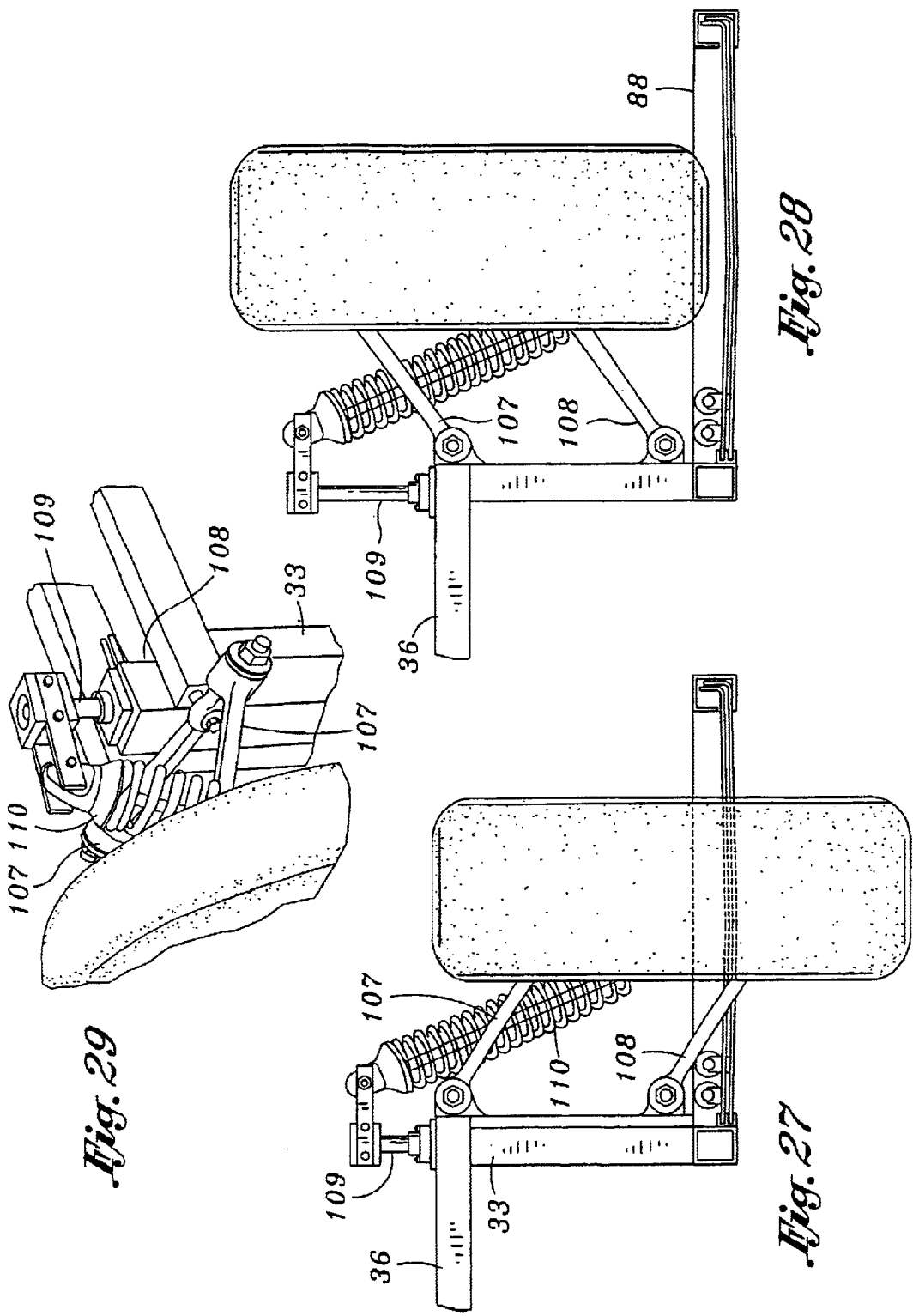

AMPHIBIOUS VEHICLE

BACKGROUND OF THE INVENTION

The field of the invention is amphibious vehicle and the invention relates more particularly to vehicles which convert between an automobile and a water vehicle.

Amphibious vehicles have been known for many years. It has been reported that only one amphibious vehicle has been made in commercial production. That was the Amphicar, which was built in Germany from 1961 to 1968. This vehicle had a top speed of only 7 mph on water. It was driven in the water by a pair of propellers.

Recent amphibious vehicles which are the subject of patents commonly use a jet drive and in spite of the many different designs, none have exhibited significant commercial success to date.

BRIEF SUMMARY OF THE INVENTION

It is an object of the present invention to provide an amphibious vehicle which looks remarkably like a conventional automobile on land, and yet is capable of relatively high speed in the water.

The present invention is for an amphibious vehicle having a frame which supports a body which has a buoyant hull portion. Front and rear wheels are provided with means for raising and lowering the wheels. A water jet pump assembly is supported in the body and has a water intake in the bottom of the hull portion. An impeller moves water rearwardly to a water outlet jet at the stern of the hull portion of the vehicle. An engine is supported by the frame and is mounted over the water jet pump assembly. The engine drives both the wheels and the water jet pump selectively. In one embodiment, the frame of the vehicle has two longitudinal frame members joined near the front by a bridge frame supporting the front wheel controls, and at the rear by a rear bridge frame extending upwardly and connected by a cross member. Port and starboard front and rear wheel bottom plates extend from a recessed position to an extended position where they slide under the raised wheels. The bottom plates do not extend significantly upwardly to cover the sides of wheel wells which open to the sides of the vehicle.

BRIEF DESCRIPTION OF THE DRAWINGS

FIG. 1 is a side view of the amphibious vehicle of the present invention configured for land travel.

FIG. 2 is a front view thereof.

FIG. 3 is a rear view thereof.

FIG. 4 is a side view of the amphibious vehicle of FIG. 1 configured for use in water.

FIG. 5 is a front view of the vehicle of FIG. 4.

FIG. 6 is a rear view of the vehicle of FIG. 4.

FIG. 7 is an exploded front view showing the body portion of the vehicle of FIG. 1 above the frame of the vehicle of FIG 1.

FIG. 8 is a view analogous to FIG. 7, except showing the body positioned over the frame.

FIG. 8A is an enlarged cross-sectional view of the left front wheel and accompanying water diversion plates.

FIG. 9 is an exploded side view of the vehicle of FIG. 1.

FIG. 10 is a side view of the engine, transaxle and water jet pump of the amphibious vehicle of FIG. 1.

FIG. 11 is a perspective view of the water jet pump of FIG. 10.

FIG. 12 is a cross-sectional view taken along line 12—12 of FIG. 10.

FIG. 15 is an enlarged side view partly in cross-section of the power transfer assembly of FIG. 13.

FIG. 16 is a perspective view of the power transmission member and shifting assembly of FIG. 15.

FIG. 17 is a perspective view of the power input member of FIG. 15.

FIG. 19A is a perspective view of the underside of the front of the body of the vehicle of FIG. 1.

FIG. 24 is a perspective view showing the bottom plate under the raised left front wheel in a partially extended configuration.

FIG. 25 is a perspective view showing the bottom plate under the raised left front wheel in a fully extended configuration.

FIG. 27 is a front view of one of the wheels of the vehicle of FIG. 1 in a partially raised configuration.

FIG. 28 is a front view of one of the wheels of the vehicle of FIG. 1 in a fully raised configuration.

FIG. 29 is an enlarged perspective view of the top portion of the assembly of FIG. 28.

DETAILED DESCRIPTION OF THE INVENTION

Figure 13:
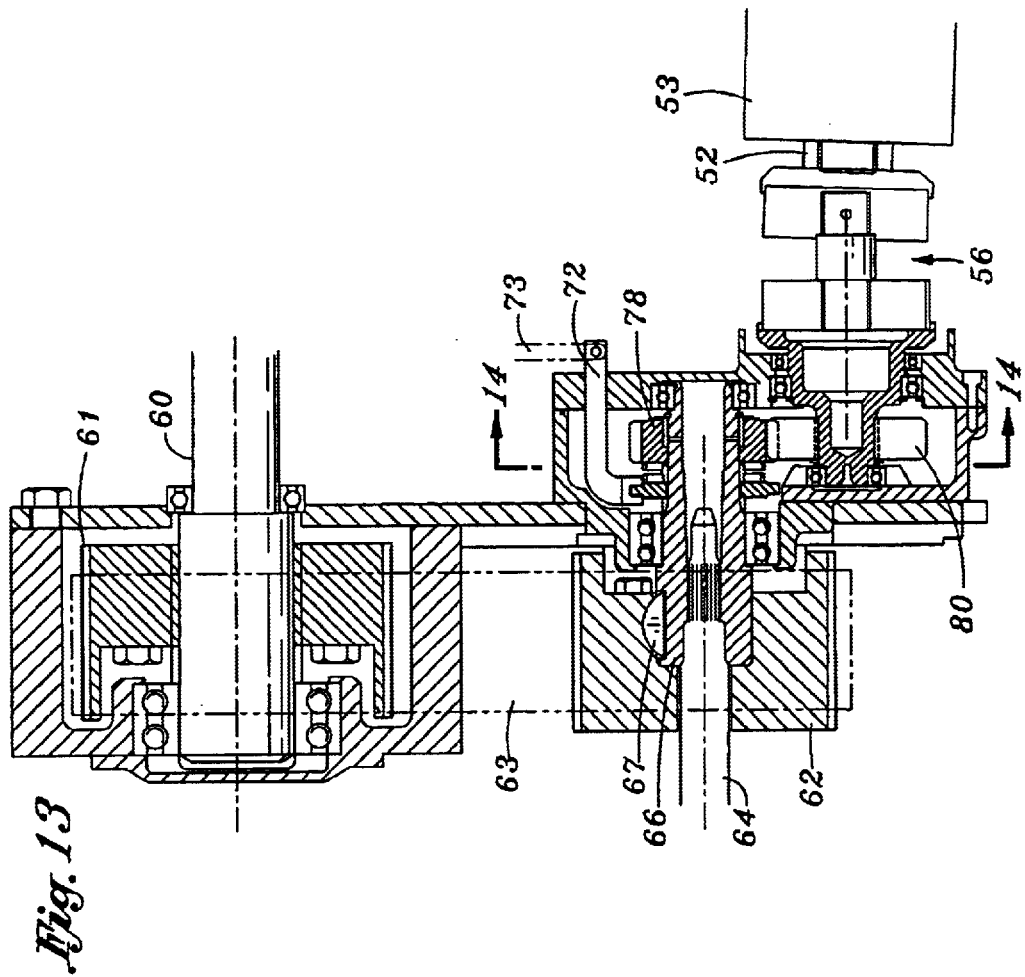
FIG. 13 is a cross-sectional view taken along line 13—13 of FIG. 12.
Figure 14:
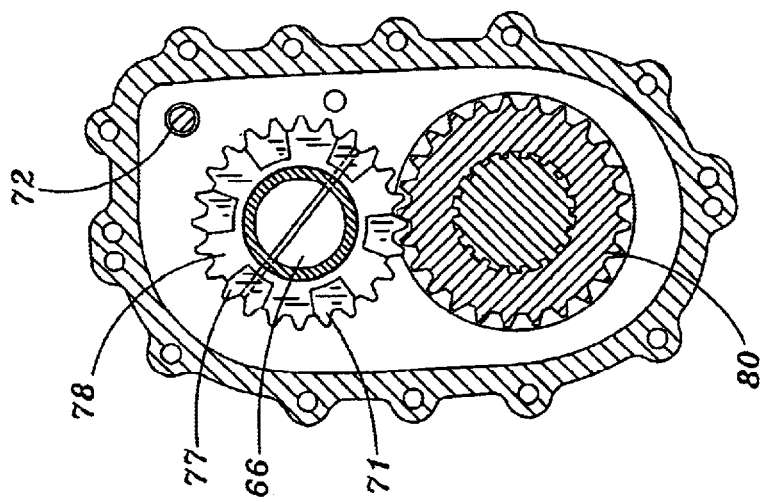
FIG. 14 is a cross-sectional view taken along line 14—14 of FIG. 13.

The amphibious vehicle of the present invention is shown in side view in FIG. 1 and indicated generally by reference character 10. Amphibious vehicle 10 has a body 11, which in one embodiment is fabricated from a composite material, such as a fiberglass composite. Vehicle 10 has a left front tire 12 and a left rear tire 13. A jet drive outlet 14 extends from the rear or stern 15. The front or bow 16 to the stern 15 in the embodiment shown in FIG. 1 comprises a single unitary body. A door 17 has a bottom edge 18 which is further away from the bottom 19 of the vehicle than most conventional doors. A left front wheel well exposes essentially all of tire 12. The left rear wheel well 21 exposes essentially all of left rear tire 13. A radiator 111 is shown in phantom view in FIG. 1.

Vehicle 10 is shown in front view in FIG. 2 and shows right front tire 22. It also exhibits a central recess 23 which is surrounded by a pair of pontoons 24 and 25, which are part of body 11 and described in more detail below.

FIG. 3 shows a rear view of vehicle 10 where right rear tire is indicated by reference character 26. There it can be seen that jet drive outlet 14 is positioned just above the bottom 19 of body 11. The engine of the vehicle is covered by engine cover 27.

When the vehicle is in the water, the wheels are raised, as shown in FIG. 4. The view of FIG. 4 shows the vehicle in motion where the water level 28 is not far above bottom 19. The raised front and rear left tires are indicated by reference characters 12' and 13'.

When vehicle 10 is at rest in the water, it floats at a level indicated by water level 29 shown in phantom view in FIG. 4. Vehicle 10 is shown in front view in the water where the forward motion and the at rest water levels 28 and 29 are shown. FIG. 6 shows the vehicle from the rear in the water.

FIG. 7 shows an exploded front view of vehicle 10 where the at rest water level 29 is indicated. The view in FIGS. 7 and 8 is depicted at the front axle vertical position where the water 30 actually rises in the recess within the otherwise buoyant hull portion 31. In FIG. 7 a right longitudinal frame member 32 supports a right front vertical frame member 33. Similarly, left longitudinal frame member 34 supports a left front vertical frame member 35. A cross arm 36 is affixed across the top of vertical frame members 33 and 35.

Figure 18:
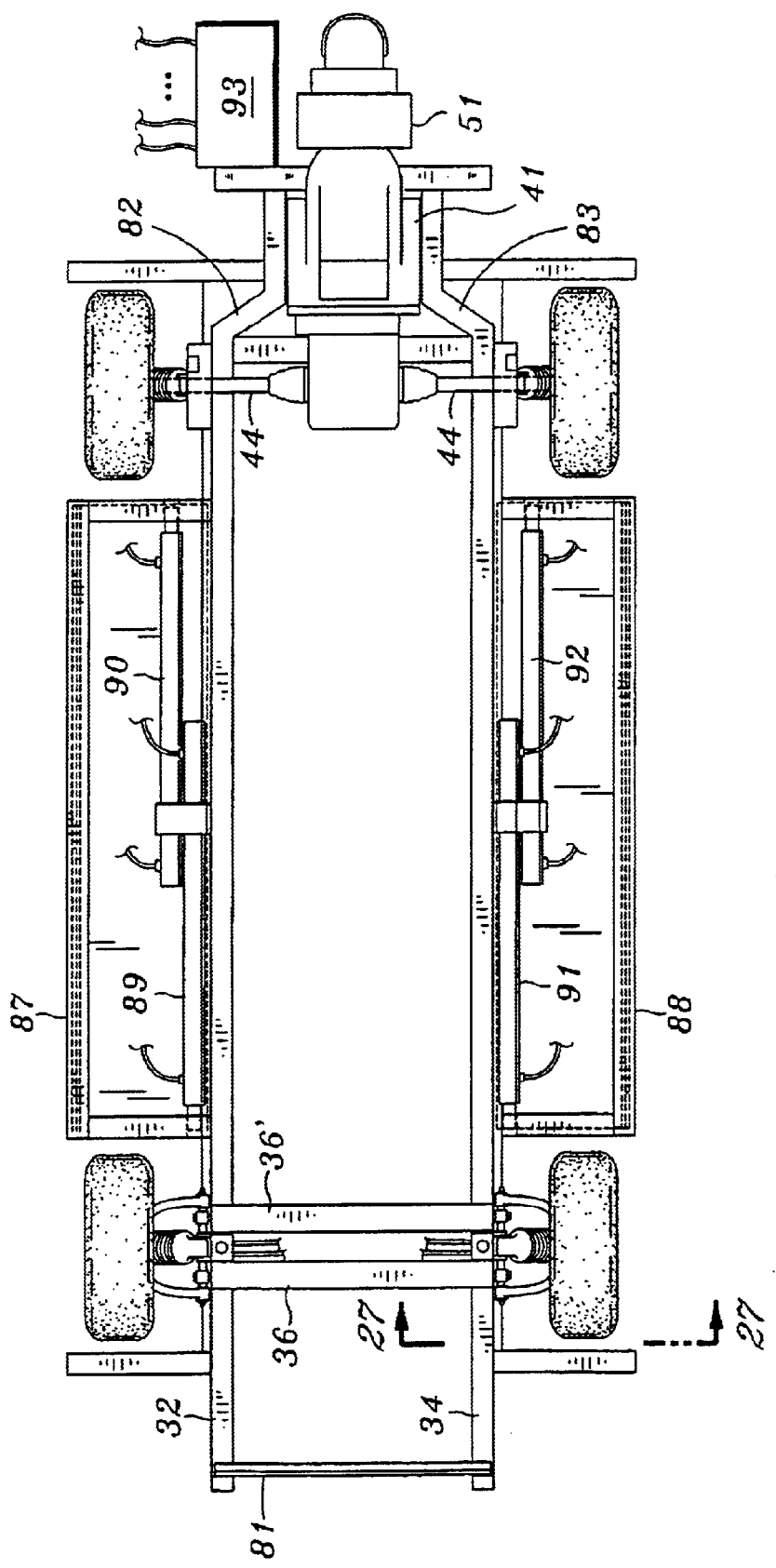
FIG. 18 is a top view of the frame, wheel assembly and wheel bottom plates of the vehicle of FIG. 1.

As shown in FIG. 18, there are actually a pair of right vertical frame members and left vertical frame members and cross arms 36 and 36'. It is to be understood that the frame members 36 and 36' could be formed in other configurations such as a unibody construction or an X-frame configuration.

A cross-sectional view of the body mounted on the frame at the position of the front wheels is shown in FIG. 8. An enlarged portion of FIG. 8 is shown in FIG. 8A.

An exploded side view of vehicle 10 is shown in FIG. 9, where the frame is indicated generally by reference character 40 and left longitudinal frame member 34 is shown extending from its front edge 37 to its rear edge 38. The simplicity of the design of the amphibious vehicle of the present invention is illustrated clearly in FIG. 9. Body 11 basically rests on frame 40 and a pair of longitudinal recesses 39 surround the sides and top of longitudinal frame member 34. This is, of course, present at both the right and left sides of the vehicle and provides a streamlined underside of the vehicle.

The engine 41 is supported by frame 40 and is positioned above water jet pump assembly 42. This provides substantially more room within the vehicle than if the engine were mounted with its output facing the rear of the vehicle in line with the impeller drive of water jet pump assembly 42. This is accomplished by the power transfer assembly shown best in FIGS. 12 and 13 and discussed below.

Engine 41 is also mounted above a portion of transaxle 43 from which a left drive shaft 44 extends. Left drive shaft 44 preferably has a water seal 45 mounted between it and transaxle 43.

Wheel drive openings 47 and 48 are shown in the body 11 in FIG. 9. Wheel opening 48 is surrounded on its inside surface by a waterproof tube which leads to transaxle 43 since the left drive shaft 44 is otherwise located within the interior of the buoyant body 11.

An enlarged view of the engine 41 jet pump assembly 42 and transaxle 43 is shown in FIG. 10. The water jet pump assembly 42 is shown in perspective view in FIG. 11 comprising an intake housing 54, a jet body 53, and a water outlet 49. As seen in FIG. 10, at least part of the engine 41 is directly above at least part of the jet body 53. An impeller 50 is located within housing 51. Impeller 50 is driven by an impeller drive shaft 52 which extends to the front of jet body 53. Jet body 53 is within the interior of the hull portion of body 11. An intake housing 54 has a water intake opening 55. Intake housing 54 is sealed in the bottom of body 11.

The impeller drive shaft 52 is turned through a CV coupling 56. As shown in FIG. 10, a power output shaft 57 provides input to clutch 59. Of course, other means for engaging or disengaging the output could be used, such as an automatic transmission. The clutch output turns clutch output shaft 60 when clutch 59 is engaged. Shaft 60 drives pulley 61, which in turn, drives pulley 62 through drive belt 63. Pulley 62 turns transaxle input shaft 64 continuously as long as clutch 59 is engaged. A gear box 65 interconnects transaxle input shaft 64 with wheel drive shaft 44 when appropriately shifted into a drive configuration in a conventional manner.

The pulley and belt configuration is shown in FIG. 12. The pulleys and belts are preferably provided with teeth to prevent slippage.

Other details of the power input to the wheels and to the jet pump assembly are shown in FIG. 13, where driven pulley 62 is locked to splined shaft 66 through key 67. Spline shaft 66 turns transaxle input shaft 64 and also turns a power transmission member 68, shown in perspective view in FIG. 16 and indicated by reference character 68. Power transmission member 68 has inner teeth 69 which move longitudinally over splines 70, as shown best in FIG. 15. As shown in FIG. 16, a forked ring control member 71 controls the longitudinal movement of power transmission member 68. Forked ring control member 71 is moved by control shaft 72, which in turn, is moved by the movement of lever 73, which is pivoted at 74 to the gear box 15 cover.

Returning to FIG. 15, when the dog ring 68 is moved in the direction of arrow 75, it interconnects the dog drives 76 with the dog drives 77 on impeller drive upper gear 78. Impeller drive upper gear 78 is mounted so that it freely rotates about splined shaft 66 through needle bearing 79. Impeller drive upper gear 78 is meshed with impeller input gear 80 which turns CV coupling 56 to turn the impeller input shaft 52.

Engine 41 is preferably of sufficient horsepower to cause the hull of body 11 to plane as it passes over the water. 300 hp is an example of one embodiment of engine useful in the amphibious vehicle of the present invention.

Once the wheels are in a raised configuration, such as that shown in FIG. 4 of the drawings, forward plate 95 and rearward plate 97 may be extended so that they pass under the tires and under the wheel wells, as described in more detail below. The frame of vehicle 10 is shown in a top view in FIG. 18. The right and left longitudinal frame members 32 and 34 are preferably interconnected by cross member 81. Longitudinal frame members 32 and 34 are angled inwardly at 82 and 83. The frame members 32 and 34 are also interconnected by rear vertical portions 84 and 85, which are tied together by removable cross member 86, as shown in FIG. 19.

Figure 19:
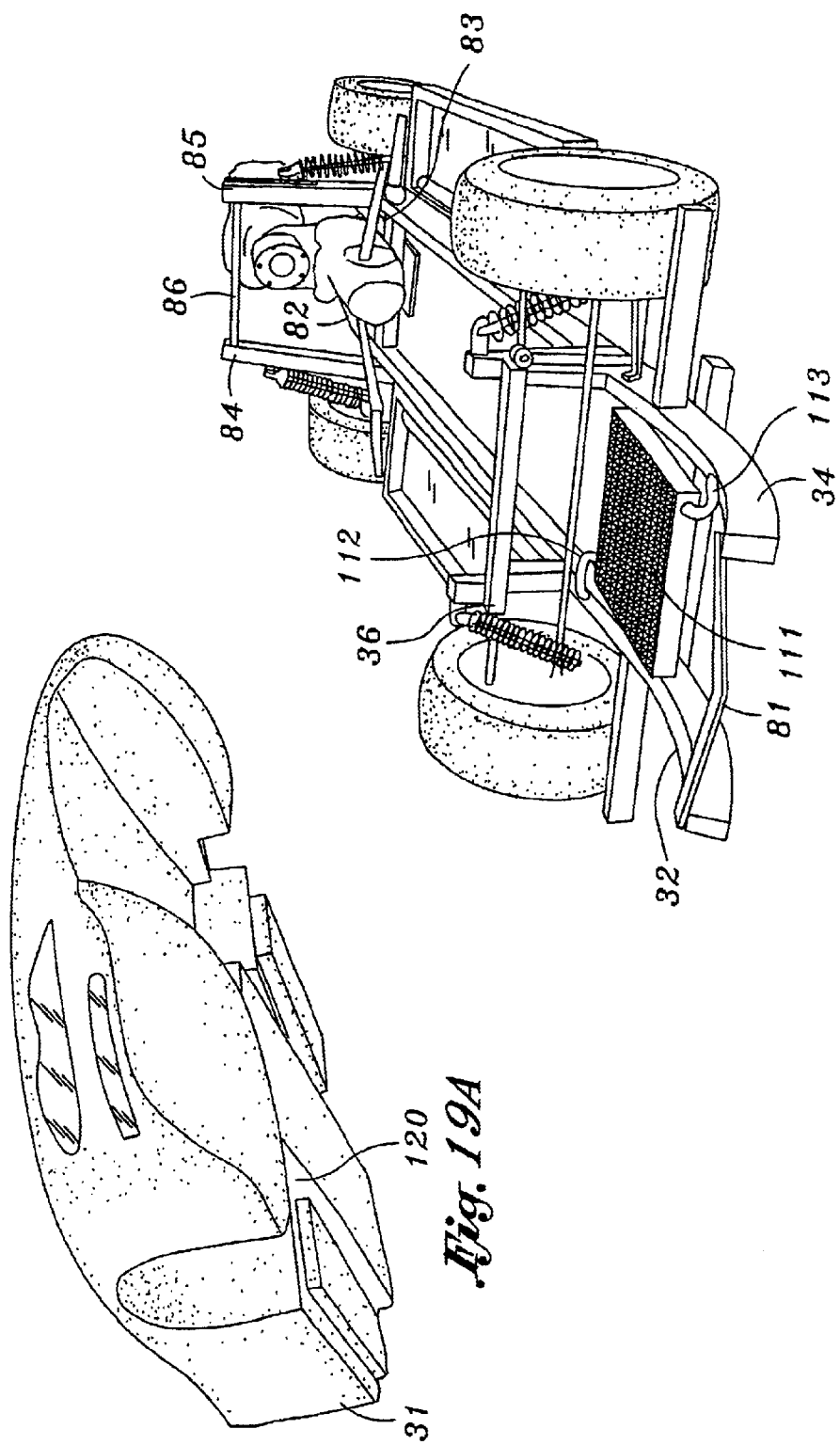
FIG. 19 is a perspective view of the frame of FIG. 18.
Figure 20:
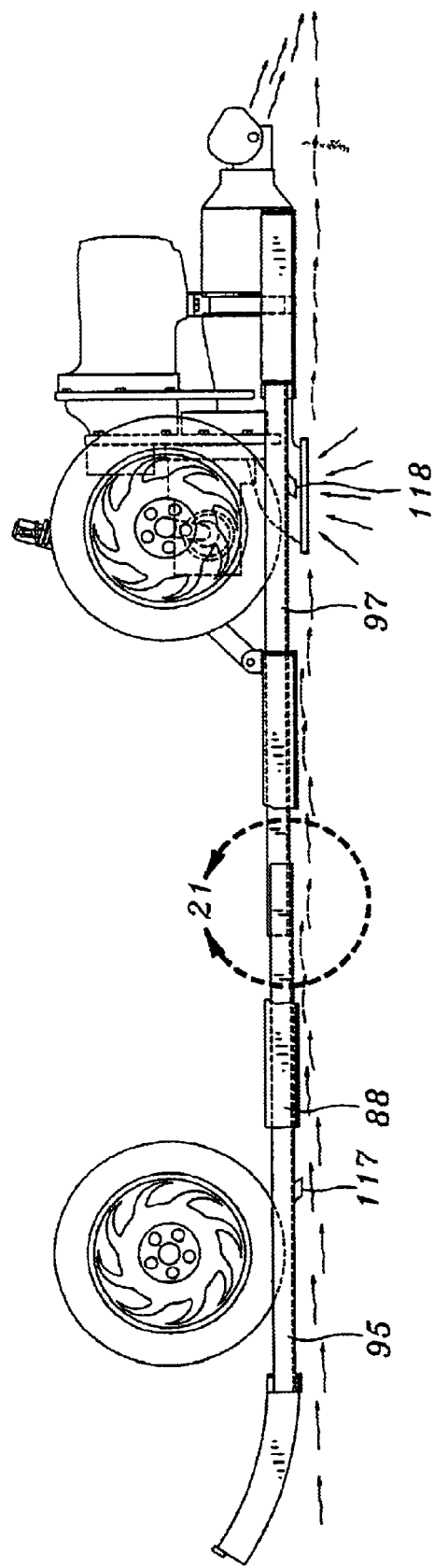
FIG. 20 is a side view of the vehicle of FIG. 1 with the body removed showing the wheel plates in an extended configuration.
Figure 26:
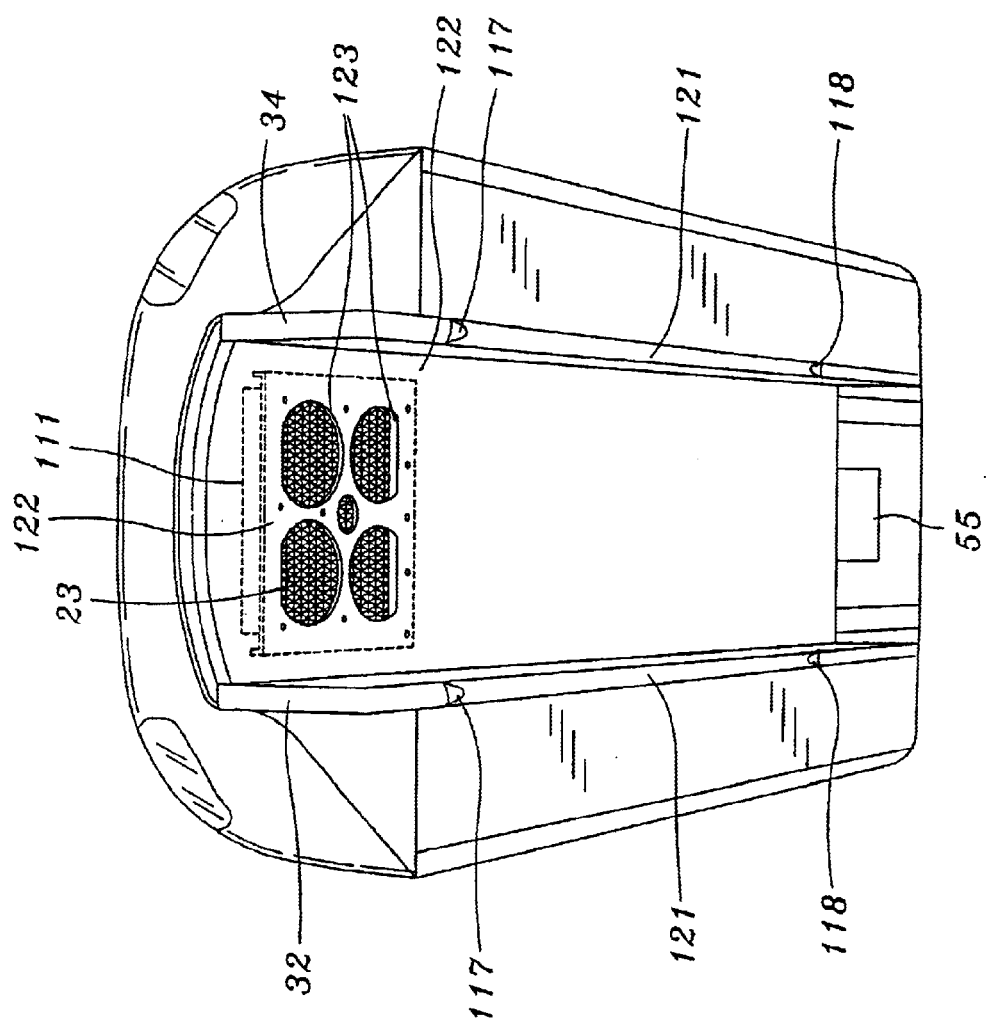
FIG. 26 is a perspective view of the bottom of the vehicle of FIG. 1.

Also shown in FIG. 19 is a radiator 111 mounted in a front compartment indicated in FIG. 26. Radiator 111 has a coolant inlet hose 112 and a coolant outlet hose 113. Hose 113 leads to copper tube 114 which runs along an interior passageway 115 and contains coolant 116 (see FIG. 23). The interior passageway 115 is provided with a flow of cooling water 119 through scoops 117 and 118 as shown in FIGS. 20 and 26. Heat is readily transferred through the walls of copper pipe 114 into the water 119. The radiator coolant is fed to engine 41 through hoses, not shown, similar to hoses 112 and 113.

The wheel bottom plates are held in right and left frames 87 and 88 affixed to longitudinal frame members 32 and 34 as shown in FIG. 18. Hydraulic cylinders 89, 90, 91, and 92 control the movement of the plates. A hydraulic motor 93 provides hydraulic fluid under pressure to the cylinders.

Figure 21:
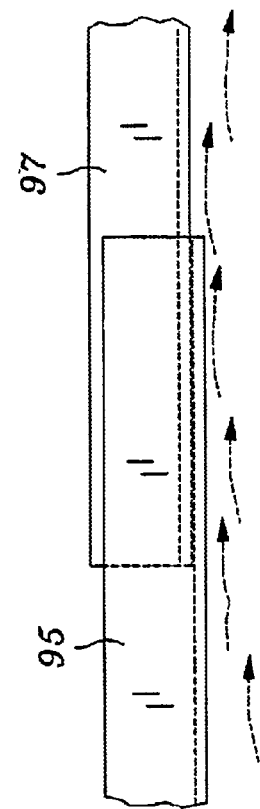
FIG. 21 is an enlarged view taken along circle 21 of FIG. 20.

The plates indicated generally by reference character 94 are shown in an extended configuration in FIG. 20 and slide outwardly from frame 88 and completely enclose the bottom opening of the wheel well under which they slide. The plates are telescoped, as shown in FIG. 21 of the drawings.

Figure 23:
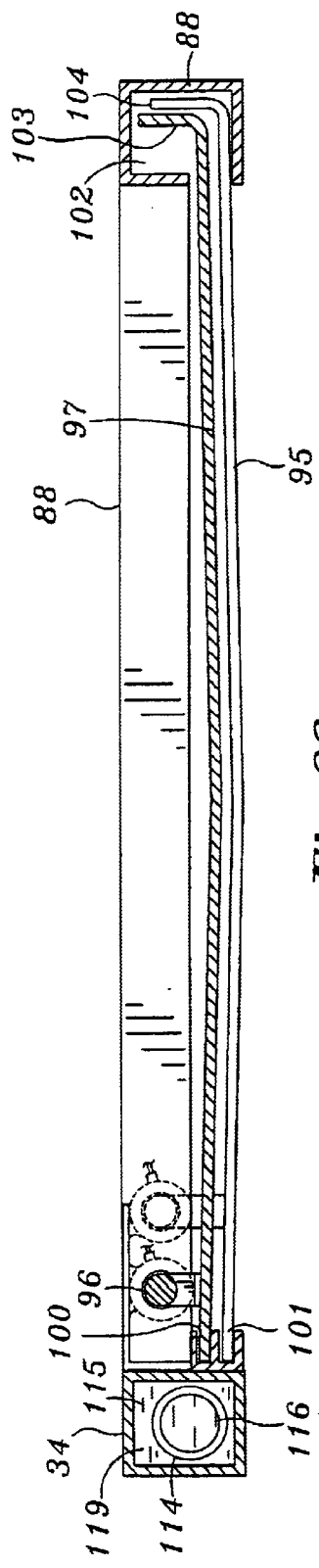
FIG. 23 is a cross-sectional view taken along line 23—23 of FIG. 22.
Figure 22:
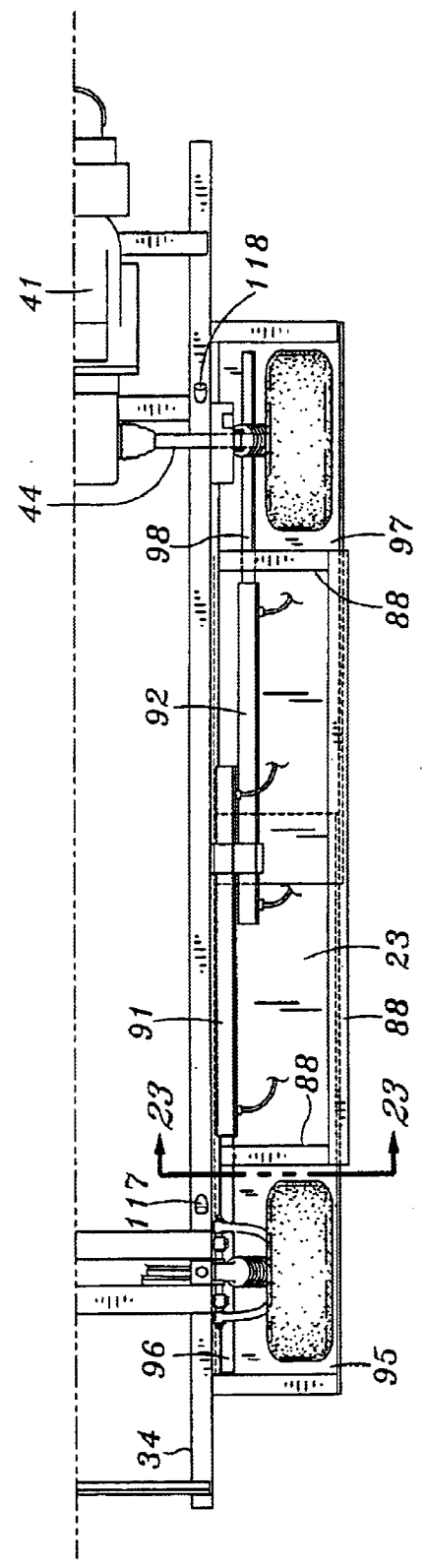
FIG. 22 is top view of the frame of the vehicle of FIG. 1 with the wheel bottom plates in an extended configuration.

Turning now to FIG. 23, the forward half 95 telescopes outwardly from frame 88 when the piston rod 96 is extended from cylinder 91. Similarly, the rear plate 97 is extended rearwardly by the extension of piston rod 98 from cylinder 92.

As shown in FIG. 23, plates 95 and 97 are held at the frame end by a pair of slots 100 and 101. A channel 102 holds the upturned outer edges 103 and 104 of plates 97 and 95, respectively.

The movement of forward plate 95 is shown in perspective view in FIGS. 24 and 25 where it can be seen that the plates extend completely between longitudinal frame member 34 and the outer portion of plate frame 88. Thus, the underside of the hull, as shown in FIG. 26, is remarkably smooth. A portion of the underside is shown in FIG. 8A. In FIG. 26, the forward recess is visible, as is water intake 55. A pair of plate support tabs 105 and 106 are held on a support arm 107 and provide end support to plate 95 when it is fully extended. As can also be seen from FIG. 21, the plates overlap in the center section between the front and rear wheel wells so that all four plates overlap when recessed.

As also shown in FIG. 26, the frame members 32 and 34 are held in recesses 120 formed in the body 11. The recesses 120 (see FIG. 19A) and frame members 32 and 34 are configured to expose the bottom 121 of the frame members in a smooth planar manner with the bottom of body 11.

The central recess 23 has a portion 122 which is positioned below radiator 111. A plurality of openings 123 permit air or air and water to pass therethrough to provide additional cooling to radiator 111. Since the radiator 111 is above the waterline, only a limited amount of water will splash through the openings. Such water will also drain out of the openings 123.

The wheel raising mechanism of vehicle 10 is shown in FIGS. 27, 28, and 29. The wheel is shown partially raised in FIG. 27, where it can be seen to be supported by an upper pivot arm 107 and a lower pivot arm 108. The wheel is raised by cylinder 130, which drives piston rod 109, which pulls shock absorber 110 upwardly. The fully raised position is shown in FIG. 28. Cylinder 130 is shown in FIG. 29. It also can be seen in FIG. 29 that there are a pair of upper arms 107. There are also a pair of lower arms 108.

Returning now to FIG. 4 of the drawings, the plates 95 and 97 extend the entire width of wheel wells 20 and 21. They do not, however, extend significantly upwardly to cover the side opening of wheel wells 20 and 21. Because of the smooth and planing nature of the bottom 19 of body 11, the amphibious vehicle planes at the water surface sufficiently high so that no significant turbulence occurs at the wheel well sides when the vehicle is in a planing configuration.

The result is an amphibious vehicle which has a very attractive vehicle appearance and yet, is capable of significant speed and maneuverability in the water. By providing sufficient horsepower, the amphibious vehicle can reach speeds appropriate for water skiing and other such sports. The ease of assembly of the vehicle makes it appropriate for kit manufacturing.

While a jet drive has been described herein, other drive means may be provided, such as an inboard/outboard drive or other propeller-utilizing drives. While a pair of front wheels is shown, it is to be understood that a single front wheel could be used when desired.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

I claim:

1. An amphibious vehicle comprising:

a frame portion;

a body attached to said frame portion, said body having a buoyant hull portion having a bow, a stern and a bottom;

at least one front wheel supported by said frame portion and positioned near the bow of said buoyant hull portion said at least one front wheel including means for raising and lowering said at least one front wheel;

a pair of rear wheels supported by said frame portion and positioned near the stern of said buoyant hull portion, said pair of rear wheels including means for raising and lowering said pair of rear wheels;

a water jet pump assembly having a pump assembly body supported within said hull portion adjacent the stern thereof, said water jet pump assembly having a water intake in the bottom of said hull portion, an impeller within said pump assembly body, said impeller moving water rearwardly through a jet body to a water outlet jet directing water outwardly with respect to the stern of said hull portion;

an engine supported by said frame and at least part of the engine is directly above at least part of the jet body;

means for selectively transferring power between said engine and said impeller; and means for selectively transferring power between said engine and at least one of said pair of rear wheels.

2. The amphibious vehicle of claim 1 wherein said engine has an engine length and more than one half of the engine length is positioned directly over said jet body of said water jet pump assembly.

3. The amphibious vehicle of claim 1 wherein all of said engine length is positioned directly over said jet body of said water jet pump assembly.

4. The amphibious vehicle of claim 1 wherein said engine has a power output shaft which faces said bow of said hull portion.

5. The amphibious vehicle of claim 4 wherein said engine power output shaft drives means for engaging and disengaging an output shaft which rotates when said means for engaging and disengaging said output shaft is engaged; and further including means for connecting said output shaft to a driven shaft, wherein said driven shaft is connected to a transaxle input, and said driven shaft also selectively providing rotational force to said impeller.

6. The amphibious vehicle of claim 5 wherein said means for selectively providing rotational force to said impeller comprises a splined shaft turned by said driven shaft, said splined shaft supporting a power transmission member longitudinally movable between an engaged position and a disengaged position and wherein said power transmission member is in an engaged position, said power transmission member turns an impeller power input member connected to said impeller.

7. The amphibious vehicle of claim 6 wherein said impeller power input member is held on said splined shaft through a bearing which permits the free rotation of said impeller power input member about said splined shaft when said power transmission member is disconnected from said impeller power input member but turns with said impeller power input member when said power transmission member is connected to said impeller power input member.

8. The amphibious vehicle of claim 7 wherein said power transmission member is connected to said impeller power input member by a dog ring drive on said power transmission member and a mating dog ring drive on said impeller power input member.

9. The amphibious vehicle of claim 5 wherein the output shaft is a clutch output shaft, and wherein said means for connecting said clutch output shaft to a driven shaft comprises a drive belt connected between a pulley connected to said clutch output shaft and a pulley connected to said driven shaft.

10. An amphibious vehicle having a pair of front wheels and a pair of rear wheels, said amphibious vehicle comprising:
a frame having at least one longitudinal frame member;
a body supported by said frame, said body having a buoyant hull portion with an exterior surface and an interior surface and having a bow, a stern and a bottom and said body having at least one recess extending up from the bottom to accept a major portion of said at least one longitudinal frame member and said at least one recess being shaped to accept said at least one frame member so that said at least one frame member forms a smooth bottom surface between said bottom of said body and with a bottom of said frame member being exposed to water when said amphibious vehicle is in the water;
means for raising and lowering said pair of front wheels;
means for raising and lowering said pair of rear wheels; and
means for propelling said amphibious vehicle through the water including an engine supported by said frame and a water impelling unit.

11. The amphibious vehicle of claim 10 wherein said frame has a pair of longitudinal frame members connected by at least one front bridge frame near said pair of front wheels and connected by at least one rear bridge frame near said pair of rear wheels each of said front and rear bridge frames having at least one pair of vertical members and a horizontal member attached to said pair of vertical members.

12. The amphibious vehicle of claim 11 wherein said engine is mounted aft of said at least one rear bridge frame.

13. The amphibious vehicle of claim 11 wherein said horizontal portion of said rear bridge frame is removable.

14. The amphibious vehicle of claim 10 wherein said at least one longitudinal member of said frame is located along a majority of its length in a downwardly directed recess in said bottom of said buoyant hull portion.

15. An amphibious vehicle having a pair of front wheels and a pair of rear wheels, said wheels being movable between a raised position and a lowered position:
a frame including a pair of longitudinal frame members;
a body supported by said frame, said body having a buoyant hull portion with an exterior surface and an interior surface and having a bow, a stern, a bottom having a starboard side and a port side and said bottom having an upward recessed area between said pair of longitudinal frame members extending from the bow of the body toward the stern.

16. The amphibious vehicle of claim 15 wherein said recessed area has a roof portion forward of said pair of front wheels and has a radiator supported above said roof portion, said radiator being supplied with a circulated coolant liquid to and from an engine of said vehicle.

17. The amphibious vehicle of claim 16 wherein said roof portion has a plurality of openings therethrough.

18. The amphibious vehicle of claim 16 wherein said circulated coolant liquid is conveyed to and from said engine by a radiator inlet coolant line and a radiator outlet coolant line and at least one of said lines is located within at least one of said pair of longitudinal frame members.

19. The amphibious vehicle of claim 18 wherein said at least one of said pair of longitudinal frame members has a closed cross sectional shape comprising an inner passageway and has a water intake therethrough to permit water to flow along said inner passageway and to cool said circulated coolant.

20. An amphibious vehicle having a pair of front wheels and a pair of rear wheels, said wheels being movable between a raised position and a lowered position, the vehicle comprising:
a frame including a pair of longitudinal frame members;
a body supported by said frame, said body having a buoyant hull portion with an exterior surface and an interior surface and having a bow, a stern, a bottom having a starboard side and a port side and wherein said body includes a pair of front wheel wells and a pair of rear wheel wells, all of said wheel wells having open sides exposing said wheels from a side of said body and said body extending outwardly along each side beyond said wheels and said body including a length between each of said front wheel wells and said rear wheel wells being an inter well length; and
port and starboard, front and rear wheel bottom plates extendable between a recessed position and an extended positions under said pair of front wheel wells and said pair of rear wheel wells when said wheels are in a raised position, said bottom plates exposing a majority of the open sides of said wheel wells in the extended positions.

21. The amphibious vehicle of claim 20 wherein said port front and rear bottom plates and said starboard front and rear bottom plates are held in port and starboard plate frames respectively, each plate frame being affixed to one of said pair of longitudinal frame members, said plate frames extending outwardly to said starboard side and said port side and each plate frame being located in said inter well length and each plate frame having a pair of parallel longitudinal members including at least one plate supporting slot and wherein said plates slide in said plate supporting slots between a recessed configuration and an extended configuration.

22. The amphibious vehicle of claim 21 wherein each wheel bottom plate comprises an upper and a lower telescoped plate portion.

23. The amphibious vehicle of claim 20 wherein the extension of said plates between a recessed position and an extended position is controlled by a hydraulic cylinder and piston assemble.

24. An amphibious vehicle comprising:

a frame including at least one longitudinal frame member having a closed interior space;

a body supported by said frame, said body having a buoyant hull portion having a bow, a stern and a bottom;

at least one front wheel supported by said frame and positioned near the bow of said buoyant hull portion said at least one front wheel including means for raising and lowering said at least one front wheel;

a pair of rear wheels supported by said frame and positioned near the stern of said buoyant hull portion, said pair of rear wheels including means for raising and lowering said pair of rear wheels;

a water impelling unit supported by said frame, said water impelling unit moving water rearwardly with respect to the stern of said hull portion;

an engine supported by said frame; and a radiator having a coolant inlet line connected to said engine and a coolant outlet line connected to said engine and wherein at least one of said coolant inlet and coolant outlet lines has a coolant length within said closed interior space of said at least one longitudinal frame member to allow for additional cooling of said engine when said vehicle is operated in the water.

* * * * *